US009266036B2

(12) United States Patent
Luebke et al.

(10) Patent No.: US 9,266,036 B2
(45) Date of Patent: Feb. 23, 2016

(54) APPARATUS FOR THE INTEGRATION OF DEHYDROGENATION AND OLIGOMERIZATION

(71) Applicant: UOP LLC, Des Plaines, IL (US)

(72) Inventors: Charles P. Luebke, Mount Prospect, IL (US); Christopher P. Nicholas, Evanston, IL (US); Steven L. Krupa, Fox River Grover, IL (US); Hosoo Lim, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/561,240

(22) Filed: Dec. 5, 2014

(65) Prior Publication Data
US 2015/0157998 A1 Jun. 11, 2015

Related U.S. Application Data

(60) Provisional application No. 61/912,506, filed on Dec. 5, 2013.

(51) Int. Cl.
| | |
|---|---|
| *B01J 29/00* | (2006.01) |
| *B01D 3/14* | (2006.01) |
| *B01J 19/00* | (2006.01) |
| *B01J 19/24* | (2006.01) |
| *C07C 5/32* | (2006.01) |
| *C10G 45/32* | (2006.01) |
| *C10G 45/44* | (2006.01) |
| *C10G 47/32* | (2006.01) |
| *C10G 47/34* | (2006.01) |
| *C10G 50/00* | (2006.01) |
| *C10G 65/08* | (2006.01) |
| *C10G 69/12* | (2006.01) |

(52) U.S. Cl.
CPC ............ *B01D 3/14* (2013.01); *B01D 3/143* (2013.01); *B01J 29/00* (2013.01)

(58) Field of Classification Search
CPC ............ B01D 3/14; B01D 3/143; B01J 19/00; B01J 19/24; B01J 29/00; C07C 5/32–5/325; C10G 45/32; C10G 45/44; C10G 47/32; C10G 47/34; C10G 50/00; C10G 65/02; C10G 65/04; C10G 65/06; C10G 65/08; C10G 69/02; C10G 69/12; C10G 69/126; C10G 2300/10; C10G 2300/1088; C10G 2300/1092; C10G 2400/20
See application file for complete search history.

(56) References Cited

U.S. PATENT DOCUMENTS

| | | | |
|---|---|---|---|
| 4,293,722 A | 10/1981 | Ward | |
| 4,304,948 A | 12/1981 | Vora | |
| 4,542,247 A | 9/1985 | Chang | |
| 4,879,424 A | 11/1989 | Harandi | |
| 5,847,252 A | 12/1998 | Stine | |
| 5,856,604 A | 1/1999 | Stine | |
| 6,897,345 B2 | 5/2005 | Marchionna | |
| 8,470,165 B2 * | 6/2013 | Cosyns | C10G 35/09 208/134 |
| 2009/0149684 A1 * | 6/2009 | Randolph | B01J 29/185 585/315 |

OTHER PUBLICATIONS

U.S. Appl. No. 14/561,237, filed Dec. 5, 2014, Charles P. Luebke.

* cited by examiner

*Primary Examiner* — Natasha Young

(57) ABSTRACT

A process and apparatus are presented for the conversion of light paraffins to heavier liquid fuels or distillate. The process and apparatus includes conversion of a paraffin stream to an olefinic stream. The olefinic stream is passed through a reactor zone to convert the olefins to heavier hydrocarbons, including branched paraffins and branched olefins. The process includes recycling a portion of the product to the reactors for controlling the heat and reaction rate of the dimerization or oligomerization process.

20 Claims, 2 Drawing Sheets

APPARATUS FOR THE INTEGRATION OF DEHYDROGENATION AND OLIGOMERIZATION

CROSS REFERENCE TO RELATED APPLICATION

This application claims benefit of U.S. Provisional Application No. 61/912,506 filed Dec. 5, 2013, the contents of which are hereby incorporated by reference in its entirety.

FIELD OF THE INVENTION

The field of the invention is the conversion of light olefins to a distillate product stream. In particular, this is a process for producing gasoline and diesel from light paraffins via an intermediate olefin stream.

BACKGROUND

When oligomerizing light olefins within a refinery, there is frequently a desire to have the flexibility to make high octane gasoline, high cetane diesel, or combination of both. However, catalysts that make high octane gasoline typically make product that is highly branched and within the gasoline boiling point range. This product is very undesirable for diesel. In addition, catalysts that make high cetane diesel typically make product that is more linear and in the distillate boiling point range. This results in less and poorer quality gasoline due to the more linear nature of the product which has a lower octane value.

The oligomerization of butenes is often associated with a desire to make a high yield of high quality gasoline product. There is typically a limit as to what can be achieved when oligomerizing butenes. When oligomerizing butenes, dimerization is desired to obtain gasoline range material. However, trimerization and higher oligomerization can occur which can produce material heavier than gasoline such as diesel. Efforts to produce diesel by oligomerization have failed to provide high yields except through multiple passes.

When oligomerizing olefins from a fluid catalytic cracking (FCC) unit, there is often the desire to maintain a liquid phase within the oligomerization reactors. A liquid phase helps with catalyst stability by acting as a solvent to wash the catalyst of heavier species produced. In addition, the liquid phase provides a higher concentration of olefins to the catalyst surface to achieve a higher catalyst activity. Typically, this liquid phase in the reactor is maintained by hydrogenating some of the heavy olefinic product and recycling this paraffinic product to the reactor inlet.

The products of olefin oligomerization are usually mixtures of, for example, olefin dimers, trimers, and higher oligomers. Further, each olefin oligomer is itself usually a mixture of isomers, both skeletal and in double bond location. This is also true of isomers in which access to the double bond is sterically hindered. Olefin types of the oligomers can be denominated according to the degree of substitution of the double bond, as follows:

TABLE 1

| Olefin Type | Structure | Description |
|---|---|---|
| I | R—HC=CH$_2$ | Monosubstituted |
| II | R—HC=CH—R | Disubstituted |
| III | RRC=CH$_2$ | Disubstituted |
| IV | RRC=CHR | Trisubstituted |
| V | RRC=CRR | Tetrasubstituted | wherein R represents an alkyl group, each R being the same or different. Type I compounds are sometimes described as α- or vinyl olefins and Type III as vinylidene olefins. Type IV is sometimes subdivided to provide a Type IVA, in which access to the double bond is less hindered, and Type IVB where it is more hindered.

To maximize distillate produced in a refinery, refiners may contemplate oligomerizing FCC derived light olefins to make heavier oligomers, thereby shifting gasoline into the distillate range. However, not all refiners have cost advantaged FCC derived light olefin streams available. In some cases, light paraffins are the most cost advantaged feed.

Light paraffins are incapable of being converted to liquid fuels by oligomerization directly. Combination processes for the conversion of light alkanes to light alkenes, followed by oligomerization of the alkene to liquid fuels are known. U.S. Pat. No. 4,293,722 describes a process comprising dehydrogenation of propane followed by catalytic condensation to form $C_9$ hydrocarbons, U.S. Pat. No. 4,304,948 describes a process comprising dehydrogenation of butane followed by catalytic condensation to form $C_8$-$C_{12}$ hydrocarbons, U.S. Pat. No. 4,542,247 describes a process comprising dehydrogenation of paraffins followed by 2 steps of oligomerization with an intermediate separation step, U.S. Pat. No. 6,897,345 describes a process comprising the isomerization of n-butane to isobutane followed by dehydrogenation and dimerization, U.S. Pat. No. 5,856,604 describes a process comprising dehydrogenation of isobutane, compression and oligomerization, U.S. Pat. No. 5,847,252 describes a process comprising low severity dehydrogenation of isobutane, oligomerization and saturation and U.S. Pat. No. 4,879,424 describes a process comprising feeding a heated feedstream to a zeolite catalyst to form olefins and aromatics and then passing this product stream to a second reaction zone where oligomerization occurs. These combined processes suffer from drawbacks such as low pressure oligomerization, aromatic formation or formation of high quantities of gasoline. Distillate range products are desired, particularly with a high cetane number.

SUMMARY

We have found that by dehydrogenating light paraffins and feeding the dehydrogenated product stream to an oligomerization zone that distillate range oligomers can be obtained. While the following is described in conjunction with specific embodiments, it will be understood that this description is intended to illustrate and not limit the scope of the preceding description and the appended claims.

A first embodiment of the invention is an apparatus for the production of distillate, comprising a first fractionation zone having a first inlet for the passage of a paraffin stream comprising $C_3$ and $C_4$ paraffins, and an overhead outlet for the passage of isobutane and propane, and a bottoms outlet for the passage of normal butane; a dehydrogenation zone having an inlet in fluid communication with the first fractionation zone overhead outlet, and an outlet for passage of an olefin enriched stream; a first reactor system having an inlet in fluid communication with the dehydrogenation zone outlet, and an outlet for the passage of a hydrocarbon stream comprising $C_5$+ hydrocarbons; a second fractionation zone having an inlet in fluid communication with the first reactor system outlet, and a second fractionation zone overhead outlet for the passage of $C_4-$ hydrocarbons, and a second fractionation zone bottoms outlet for the passage of $C_4+$ and higher hydrocarbons; a third fractionation zone having an inlet in fluid communication with the second fractionation zone bottoms outlet, and a third fractionation zone overhead outlet for the passage of an olefinic process stream, and a third fractionation zone bottoms outlet for the passage of a distillate process stream; and a first hydrogenation process zone having an inlet in fluid communication with the third fractionation zone bottoms outlet and an outlet for the passage of a distillate product stream. An embodiment of the invention is one, any or all of prior embodiments in this paragraph up through the first embodiment in this paragraph further comprising a second hydrogenation zone having an inlet for the passage of the paraffin stream and an outlet in fluid communication with the first fractionation zone inlet. An embodiment of the invention is one, any or all of prior embodiments in this paragraph up through the first embodiment in this paragraph further comprising a third hydrogenation zone having an inlet in fluid communication with the second fractionation zone outlet, and an outlet in fluid communication with a second inlet to the first fractionation column. An embodiment of the invention is one, any or all of prior embodiments in this paragraph up through the first embodiment in this paragraph further comprising a fourth fractionation zone having an inlet in fluid communication with the third hydrogenation zone outlet, an overhead outlet for the passage of $C_3$ and lighter hydrocarbons, and a bottoms outlet in direct communication to the second inlet to the first fractionation column. An embodiment of the invention is one, any or all of prior embodiments in this paragraph up through the first embodiment in this paragraph wherein the first reactor system comprises a plurality of reactors in a series arrangement. An embodiment of the invention is one, any or all of prior embodiments in this paragraph up through the first embodiment in this paragraph wherein the second fractionation zone is in upstream and downstream communication with the first reactor system and the first fractionation zone. An embodiment of the invention is one, any or all of prior embodiments in this paragraph up through the first embodiment in this paragraph wherein the first reactor system includes a catalyst selected from the group consisting of zeolites having TON, MTT, MFI, MEL, AFO, AEL, EUO and FER type structures, and mixtures thereof. An embodiment of the invention is one, any or all of prior embodiments in this paragraph up through the first embodiment in this paragraph further comprising an isomerization, in upstream and downstream communication with the first fractionation zone, zone having an inlet in fluid communication with the first fractionation zone bottoms outlet, and an outlet for the passage of an isomerized stream to a second inlet to the first fractionation zone. An embodiment of the invention is one, any or all of prior embodiments in this paragraph up through the first embodiment in this paragraph wherein the second fractionation zone comprises a first column and a second column wherein the first column has an inlet in fluid communication with the first reactor system outlet, and a first column overhead outlet for the passage of $C_3$ and lighter hydrocarbon components, and a first column bottoms outlet for the passage of $C_4$ and heavier hydrocarbon components; and a second column having an inlet in fluid communication with the first column bottoms outlet, a second column overhead outlet in fluid communication with the first fractionation zone inlet, and a second column bottoms outlet in fluid communication with the third fractionation zone inlet. An embodiment of the invention is one, any or all of prior embodiments in this paragraph up through the first embodiment in this paragraph further comprising a $C_3$ dehydrogenation zone having an inlet in fluid communication with the first column overhead outlet, and an outlet for the passage of a $C_3$ olefin enriched stream.

A second embodiment of the invention is an apparatus for the production of distillate, comprising a dehydrogenation zone having an inlet for receiving a light paraffin feed, and an outlet for delivering a light olefins effluent; an oligomerization zone having an inlet in fluid communication with the dehydrogenation zone outlet, and an outlet for delivering a hydrocarbon stream comprising $C_5+$ hydrocarbons; and a first fractionation zone having an inlet in fluid communication with the oligomerization zone outlet, a bottoms outlet having fluid communication to the oligomerization zone inlet and a second outlet. An embodiment of the invention is one, any or all of prior embodiments in this paragraph up through the second embodiment in this paragraph further comprising a deisobutanizer column having a first inlet in fluid communication with the light paraffin feed, a first outlet in fluid communication with the dehydrogenation zone inlet and a second outlet; and an isomerization zone having an inlet in fluid communication with the deisobutanizer column second outlet, and an outlet in fluid communication with a second deisobutanizer inlet. An embodiment of the invention is one, any or all of prior embodiments in this paragraph up through the second embodiment in this paragraph further comprising a hydrotreating zone having an inlet in fluid communication with the light paraffin feed, and an outlet in fluid communication with the deisobutanizer column. An embodiment of the invention is one, any or all of prior embodiments in this paragraph up through the second embodiment in this paragraph wherein the second outlet of the first fractionation zone is in fluid communication with a third inlet to the deisobutanizer column. An embodiment of the invention is one, any or all of prior embodiments in this paragraph up through the second embodiment in this paragraph wherein the third deisobutanizer inlet is at a higher position on the deisobutanizer column than either the first or second inlets to the deisobutanizer column. An embodiment of the invention is one, any or all of prior embodiments in this paragraph up through the second embodiment in this paragraph wherein the oligomerization zone comprises a plurality of oligomerization reactors in a series arrangement. An embodiment of the invention is one, any or all of prior embodiments in this paragraph up through the second embodiment in this paragraph wherein the oligomerization zone comprises a zeolitic catalyst having a structure selected from the group consisting of TON, MTT, MFI, MEL, AFO, AEL, EUO, FER and mixtures thereof. An embodiment of the invention is one, any or all of prior embodiments in this paragraph up through the second embodiment in this paragraph further comprising a second fractionation zone having an inlet in fluid communication with the first fractionation zone bottoms outlet for passage of a stream comprising an olefinic $C_9+$ hydrocarbon stream, and a second outlet comprising a lighter olefinic stream; and a first hydrogenation zone having an inlet in fluid communication with the bottoms outlet of the second fractionation zone, and an outlet for passage of a completely saturated distillate hydrocarbon stream.

A third embodiment of the invention is an apparatus for converting light paraffins a liquid fuel, comprising a first fractionation zone having an inlet for the passage of a feed light paraffin stream, an overhead outlet for the passage of a stream comprising isobutane, and a bottoms outlet for the passage of a stream comprising normal butane; a dehydrogenation zone having an inlet in direct communication with the first fractionation zone overhead outlet and having an outlet for the passage of a stream enriched in olefins versus that of the feed point; a first reactor system having an inlet in direct communication with the dehydrogenation zone and an outlet for the passage of a hydrocarbon stream comprising $C_5+$ hydrocarbons; a second fractionation zone having an inlet in direct communication with the first reactor system outlet, an overhead outlet for the passage of $C_5-$ hydrocarbon stream, and a bottoms outlet for the passage of an olefinic $C_5+$ hydrocarbon stream; a third fractionation zone having an inlet in direct communication with the second fractionation zone bottoms outlet, an overhead outlet for the passage of an olefinic gasoline process stream, and a bottoms outlet for the passage of an olefinic distillate process stream, and; wherein at least a portion of the second fractionation zone overhead stream is in communication with the dehydrogenation zone inlet such that the second fractionation zone is in upstream and downstream communication with the dehydrogenation zone. An embodiment of the invention is one, any or all of prior embodiments in this paragraph up through the third embodiment in this paragraph wherein the second fractionation zone overhead stream is in direct communication with the inlet to a hydrogenation zone and the outlet to the hydrogenation zone is in fluid communication with a second inlet to the first fractionation zone such that the second fractionation zone is in upstream and downstream communication with the first fractionation zone.

A fourth embodiment of the invention is an apparatus for the production of distillate, comprising a dehydrogenation zone having an inlet for receiving a light paraffin feed, and an outlet for delivering a light olefins effluent; a first reaction zone having an inlet in fluid communication with the dehydrogenation zone outlet, and an outlet for delivering a hydrocarbon stream comprising distillate range hydrocarbons; and a first fractionation zone having an inlet in fluid communication with the first reaction zone outlet, a first outlet having fluid communication to the first reaction zone inlet and a second outlet. An embodiment of the invention is one, any or all of prior embodiments in this paragraph up through the fourth embodiment in this paragraph further comprising a second fractionation zone having an inlet in fluid communication with the first fractionation zone first outlet for passage of a stream comprising a distillate range hydrocarbon stream, and a second outlet comprising a lighter olefinic stream; and a third fractionation zone having an inlet in direct communication with the second fractionation zone bottoms outlet, an overhead outlet for the passage of an olefinic gasoline process stream, and a bottoms outlet for the passage of an olefinic distillate process stream. An embodiment of the invention is one, any or all of prior embodiments in this paragraph up through the fourth embodiment in this paragraph wherein the second fractionation zone bottoms outlet is in fluid communication with the first reactor system inlet. An embodiment of the invention is one, any or all of prior embodiments in this paragraph up through the fourth embodiment in this paragraph wherein the third fractionation zone bottoms outlet is in fluid communication with the first reactor system inlet.

Other objects, advantages and applications of the present invention will become apparent to those skilled in the art from the following detailed description and drawings.

DEFINITIONS

Figure 1:
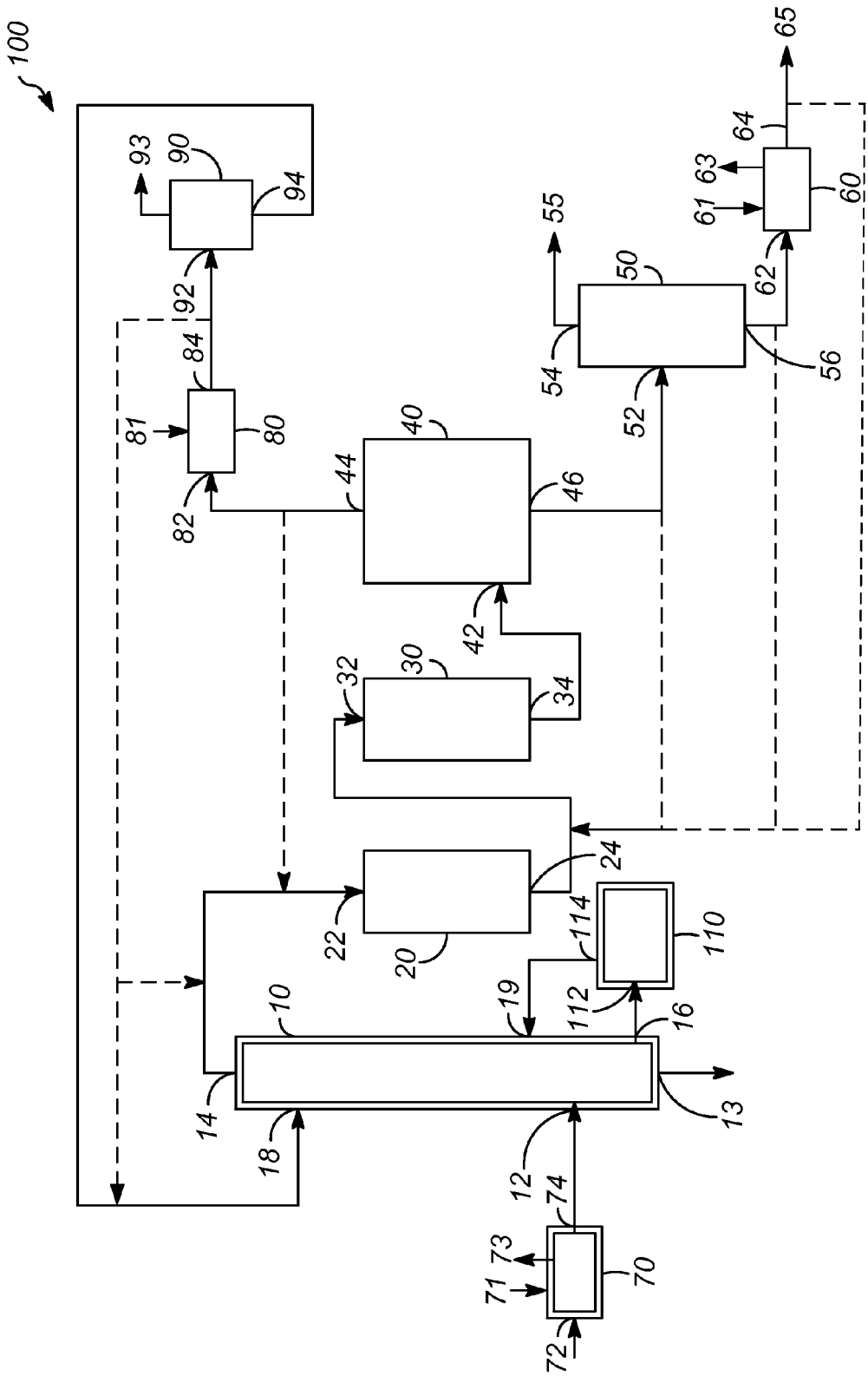
FIG. 1 is a diagram of the apparatus for the conversion of a light paraffins stream to liquid fuels.

As used herein, the term "stream" can include various hydrocarbon molecules and other substances. Moreover, the term "stream comprising $C_x$ hydrocarbons" or "stream comprising $C_x$ olefins" can include a stream comprising hydrocarbon or olefin molecules, respectively, with "x" number of carbon atoms, suitably a stream with a majority of hydrocarbons or olefins, respectively, with "x" number of carbon atoms and preferably a stream with at least 75 wt % hydrocarbons or olefin molecules, respectively, with "x" number of carbon atoms. Moreover, the term "stream comprising $C_x-$ hydrocarbons" or "stream comprising $C_x+$ olefins" can include a stream comprising a majority of hydrocarbon or olefin molecules, respectively, with more than or equal to "x" carbon atoms and suitably less than 10 wt % and preferably less than 1 wt % hydrocarbon or olefin molecules, respectively, with x−1 carbon atoms. Lastly, the term "$C_x-$ stream" can include a stream comprising a majority of hydrocarbon or olefin molecules, respectively, with less than or equal to "x" carbon atoms and suitably less than 10 wt % and preferably less than 1 wt % hydrocarbon or olefin molecules, respectively, with x+1 carbon atoms.

As used herein, the term "zone" can refer to an area including one or more equipment items and/or one or more sub-zones. Equipment items can include one or more reactors or reactor vessels, heaters, exchangers, pipes, pumps, compressors, controllers and columns. Additionally, an equipment item, such as a reactor, dryer, or vessel, can further include one or more zones or sub-zones.

As used herein, the term "substantially" can mean an amount of at least generally about 70%, preferably about 80%, and optimally about 90%, by weight, of a compound or class of compounds in a stream.

As used herein, the term "gasoline" can include hydrocarbons having a boiling point temperature in the range of about 25° to about 200° C. at atmospheric pressure.

As used herein, the term "diesel" or "distillate" can include hydrocarbons having a boiling point temperature in the range of about 150° to about 400° C. and preferably about 200° to about 400° C.

As used herein, the term "light paraffin" indicates streams comprising one or more $C_3$-$C_5$ paraffins. Propane, isobutane, n-butane, isopentane and n-pentane are examples of light paraffins. Preferably, the one or more $C_3$-$C_5$ paraffin/s substantially comprise the stream.

As used herein, the term "light olefin" indicates hydrocarbon streams comprising one or more $C_3$-$C_5$ olefins derived from dehydrogenation of light paraffins.

As used herein, the term "vapor" can mean a gas or a dispersion that may include or consist of one or more hydrocarbons.

As used herein, the term "overhead stream" can mean a stream withdrawn at or near a top of a vessel, such as a column.

As used herein, the term "bottom stream" can mean a stream withdrawn at or near a bottom of a vessel, such as a column.

As depicted, process flow lines in the figures can be referred to interchangeably as, e.g., lines, pipes, feeds, gases, products, discharges, parts, portions, or streams.

As used herein, "bypassing" with respect to a vessel or zone means that a stream does not pass through the zone or vessel bypassed although it may pass through a vessel or zone that is not designated as bypassed.

The term "communication" or "fluid communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottom stream back to the bottom of the column. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, "taking a stream from" means that some or all of the original stream is taken.

As used herein, "cetane number" is determined as the derived cetane number as set forth in ASTM D6890, and "octane number" indicates the average of the research and motor octane numbers as determined by ASTM D2699 and D2700, respectively.

DETAILED DESCRIPTION

The present invention is an apparatus and process that can be used to convert light paraffins to higher molecular weight oligomers such as distillate range oligomers. The production of a high octane gasoline, or a high cetane diesel, is a process desired by refineries to convert less valuable hydrocarbon feedstocks to preferred fuels. One source of less valuable feedstock includes light paraffins, such as propane and butanes. Oligomerization is a process for converting smaller hydrocarbon molecules to larger ones, such as converting light gaseous hydrocarbons to heavier liquid hydrocarbons. However, light paraffins can not be directly converted to heavier products through oligomerization, or through dimerization, as the paraffins are unreactive in an oligomerization reactor. By combining processes, the paraffins can be converted to light olefins, and the light olefin process stream can be passed to an oligomerization reactor. Light olefins are normally generated from a variety of processes such as steam cracking of various hydrocarbon cuts, FCC, methanol-to-olefins technologies and on-purpose $C_3$ or $C_4$ paraffin dehydrogenation. Light olefins are utilized in many different petrochemical and refining processes to make a wide variety of end products.

By using the process and apparatus of the present invention, one can convert light paraffins to desired liquid fuels, such as an olefinic gasoline or diesel. One source of light paraffins is natural gas liquids, or liquefied petroleum gas. A process and apparatus are presented to provide for the conversion of light paraffins to liquid fuels.

Light paraffins are low value products, and can be converted to more valuable products by a conversion and oligomerization process. One embodiment provides for the conversion of light paraffins to a liquid fuel, such as gasoline or diesel. The light paraffins stream may comprise an overhead stream from a first fractionation zone. The process includes passing the light paraffins stream to a dehydrogenation zone to generate a first process stream comprising light olefins. Preferably, the light paraffins stream introduced to the dehydrogenation zone is substantially comprised of propane, isobutane or combinations thereof. In an embodiment, the light paraffins stream is substantially comprised of isobutane. Isobutane may comprise greater than 95 wt % of the light paraffins stream introduced to the dehydrogenation zone. Light olefins as used herein, comprise olefins in the $C_2$ to $C_5$ range and preferably in the $C_3$ to $C_5$ range. The first process stream may thus be substantially comprised by propene, isobutene or combinations thereof. In an embodiment, the first process stream may be substantially comprised of isobutene. Isobutene may comprise greater than 95 wt % of the light olefins exiting to the dehydrogenation zone. The first process stream is passed to an oligomerization zone to generate a second process stream comprising an olefinic $C_5+$ hydrocarbon stream. The oligomerization feed stream (i.e. the combination of the first process stream and any recycle streams) may comprise $C_3$ hydrocarbons such as propylene, i.e. $C_3$ olefins, and propane. The oligomerization feed stream may comprise $C_4$ hydrocarbons such as butenes, i.e., $C_4$ olefins, and butanes. Butenes include normal butenes and isobutene. The oligomerization feed stream may comprise $C_5$ hydrocarbons such as pentenes, i.e., $C_5$ olefins, and pentanes. Pentenes include normal pentenes and isopentenes. The oligomerization feed stream may comprise one or more light olefins. Typically, the oligomerization feed stream will comprise about 5 to about 80 wt % olefins, often about 7 to about 55 wt % olefins, and suitably about 10 to about 40 wt % light olefins. Because the light olefins are derived from a dehydrogenation process, the light olefins may have a different composition than olefins derived from other processes such as fluidized catalytic cracking. In an embodiment, the light olefin stream may comprise isobutene as greater than 50% of the butenes in the stream. Isobutene may substantially comprise the butenes in the light olefin stream. Isobutene may comprise greater than 75% of the butenes in the oligomerization feed stream or possibly greater than 90% of the butenes in the feed stream. The second process stream is passed to a second fractionation zone to generate an overhead stream, or third process stream, comprising $C_5-$ hydrocarbons, and a bottoms stream, or fourth process stream, comprising olefinic $C_5+$ hydrocarbons. The fourth process stream may be passed to a third fractionation zone to generate an overhead stream, or fifth process stream, comprising a gasoline product and a bottoms stream, or sixth process stream, comprising a distillate product. Preferably, the sixth process stream is passed to a first hydrogenation zone to generate a hydrogenated distillate stream, or seventh process stream.

Hydrogenation zones, such as the first hydrogenation zone, may be any of the known hydrogenation technologies such as a standard hydrotreating zone or preferably it may be a hydrogenation zone specifically tailored for the hydrogenation of olefins, such as a complete saturation process. The hydrogenation zone is a catalytic zone and as such comprises a hydrogenation or hydrotreating catalyst. Hydrogenation or hydrotreating catalysts are any of those well known in the art such as nickel or nickel/molybdenum dispersed on a high surface area support. Catalysts which are commonly used for hydrotreating include those with molybdenum or tungsten as the active species in combination with other transition metal compounds such as nickel or cobalt. Usually these catalysts are dispersed on some type of support in order to maximize the effectiveness of the metals. Additionally, other additives such as phosphorus can be incorporated into the support either to stabilize the surface area of the support or to prevent formation of compounds such as cobalt or nickel aluminate. Other hydrogenation catalysts comprise a metal component selected from nickel and one or more noble metal catalytic elements dispersed on a high surface area support. Non-limiting examples of noble metals include Pt and/or Pd dispersed on gamma-alumina. Best results are obtained when substantially all of this metal component is present in the elemental state. This component may be present in the final catalyst composite in any amount which is catalytically effective, and generally will comprise about 0.01 to 2 mass-% of the final catalyst calculated on an elemental basis. Excellent results are obtained when the catalyst contains from about 0.05 to 1 mass-% of platinum. Hydrogenation conditions include a temperature of about 20° C. to about 400° C. and a pressure of about 0.3 MPa absolute (50 psia) to about 5.2 MPa absolute (750 psia) and a liquid hourly space velocity of from about 0.5 to about 50. A preferred embodiment is the use of a complete saturation process as the hydrogenation process. Suitable catalyst for this process will completely saturate mono- and polyolefinic hydrocarbons without significant cracking or polymerization activity. As such, the hydrogenated product stream can include less than about 0.1%, by weight, alkenes, and preferably less than about 0.01%, by weight, alkenes. Operating conditions include a temperature of about 20 to about 80° C. and a pressure of about 2 to about 3.5 MPa. An exemplary noble metal can be palladium.

The process may further comprise passing a portion of the fourth process stream, to the oligomerization zone, to form the oligomerization feed stream. The oligomerization feed stream comprises the recycle and first process stream from the dehydrogenation zone to maintain a light olefin concentration in the oligomerization feed to between, for example, 10 wt % and 40 wt % of the feed. The process may further comprise passing a portion of the sixth process stream to the oligomerization zone to form the oligomerization feed stream.

The olefin concentration in the oligomerization feed stream to the reactor or reactors in the oligomerization zone can be controlled to limit the exotherm caused by the exothermic reactions such as by the dilution of light olefins concentration by recycling a portion of one or more product streams to the oligomerization reactor or reactors. Exotherm management can also include use of inter-bed coolers to remove the heat of reaction, the use of inter-bed quench streams and/or the use of isothermal tubular reactors employing a heat transfer media for heat removal as is known to one skilled in the art. An exotherm of greater than 22° C. or greater than 25° C. is preferred per reactor.

The light paraffins may comprise the paraffins from a liquefied petroleum gas (LPG), such as propane and butanes. The paraffins in LPG or shale gasses are often linear paraffins such as propane and n-butane.

In one embodiment, before passing the light paraffins to the dehydrogenation reactor, the light paraffins stream is passed to a first fractionation zone comprising a deisobutanizer column. The deisobutanizer column generates an overhead stream comprising isobutane and lighter components of the light paraffins stream. The deisobutanizer column may also generate a bottoms stream comprising normal butane. Optionally, the bottoms stream is passed to an isomerization reactor to generate an isomerized stream comprising n-butane and isobutane. The isomerized stream is passed to the deisobutanizer column for separating the isobutane and sending the isobutane out into the overhead stream. The overhead stream comprising isobutane is passed to the dehydrogenation zone as at least a portion of the light paraffins stream.

In another embodiment, the light paraffins stream may be passed to a second hydrogenation zone prior to being passed to the first fractionation zone comprising the deisobutanizer or prior to being passed to the dehydrogenation zone. In the second hydrogenation zone, the olefin content of the light paraffin stream is reduced or the poison content, such as the sulfur containing molecule content, is reduced. The outlet of the second hydrogenation zone provides an eighth process stream comprising light paraffins which may be passed to the first fractionation zone or to the dehydrogenation zone.

In another embodiment, the second process stream, which is exiting from the oligomerization zone, is passed to the second fractionation zone. The second fractionation zone may comprise a depropanizer, to where the second process stream is passed, and generates an overhead stream comprising $C_3$ hydrocarbons, and a bottoms stream comprising $C_4+$ components. The second fractionation zone may further comprise a debutanizer, wherein the depropanizer bottoms stream is passed to it, and the debutanizer generates an overhead stream comprising $C_4$ components and a bottoms stream, that is the fourth process stream.

The process can further include passing the debutanizer overhead stream to a third hydrogenation zone to generate a light paraffins stream. The light paraffins stream may then be passed to the dehydrogenation zone to generate a light olefins stream comprising light olefins for the first process stream. In a variation, the light paraffins stream from the third hydrogenation zone is passed to the first fractionation zone comprising a deisobutanizer column to generate a isobutane ($iC_4$) overhead stream and a normal butane ($nC_4$) bottoms stream. As described, the overhead stream may then passed to the dehydrogenation zone. The $nC_4$ bottoms stream may be passed to an isomerization zone to generate an isomerized $C_4$ stream comprising $nC_4$ and $iC_4$. The isomerized $C_4$ stream is returned to the deisobutanizer column to increase the $iC_4$ yield of the light paraffins stream.

The process can further include passing the $C_3$ stream from the depropanizer to a fourth hydrogenation zone to generate a $C_3$ paraffins stream. The $C_3$ paraffins stream may then be passed to the dehydrogenation zone to generate a light olefins stream comprising propane and propylene, i.e. the first process stream, and the light olefins stream is passed to the oligomerization zone.

In another embodiment, the third process stream, comprising $C_5-$ hydrocarbons is passed to a third hydrogenation zone to generate a light paraffins stream. The light paraffins stream may then be passed to a depropanizer, or $C_3$ stripper, to generate a $C_3$ overhead stream and a $C_4+$ bottoms stream. The $C_4+$ bottoms stream may be passed to the first fractionation zone comprising a deisobutanizer column to generate an overhead stream comprising isobutane. The process can further include passing the $C_3$ overhead stream to a dehydrogenation zone, to generate a dehydrogenated $C_3$ stream or light olefins stream. The dehydrogenated $C_3$ stream is passed to the oligomerization zone. The process can also further include passing the $iC_4$ overhead stream to a dehydrogenation zone, to generate a dehydrogenated $iC_4$ stream. The dehydrogenated iC$_4$ stream is passed to the oligomerization zone. In an embodiment, the dehydrogenation zone to which to the C$_3$ stream and the iC$_4$ stream are passed may be the same dehydrogenation zone or separate dehydrogenation zones.

In another embodiment, the process is for the conversion of a light paraffin stream substantially comprising C$_4$ hydrocarbons to a liquid fuel. The process may include passing the light paraffin stream to a hydrotreater to hydrogenate any olefins that may be present in the feed or to remove any poisons such as sulfur containing molecules to generate a treated light paraffin stream substantially comprising C$_4$ hydrocarbons. The light paraffin stream substantially comprising C$_4$ hydrocarbons may be passed to a first fractionation zone comprising a deisobutanizer column to generate an overhead stream comprising isobutane, and a bottoms stream comprising n-butane. The n-butane stream may be passed to an isomerization zone to generate an isomerized stream comprising n-butane and isobutane. The isomerized stream is passed to the deisobutanizer column. The isobutane overhead stream is passed to a dehydrogenation zone as at least a portion of the light paraffins feedstream to generate a dehydrogenated stream comprising isobutane and isobutenes, that is, the first process stream comprising light olefins. The dehydrogenated stream, or first process stream, is passed to an oligomerization zone to generate an oligomerization process stream, or second process stream, comprising C$_4$+ hydrocarbons. The oligomerization process stream is passed to a second fractionation zone, to generate a first overhead stream, or third process stream, comprising C$_4$− hydrocarbons, and a first bottoms stream comprising C$_4$+ hydrocarbons. A portion of the first bottoms stream, or fourth process stream, may be passed back to the oligomerization zone.

In one variation, the process includes splitting the first bottoms stream into several portions. A second portion is passed to a third fractionation zone, to generate a second overhead stream, or fifth process stream, comprising an olefinic gasoline stream, and a second bottoms stream, or sixth process stream, comprising an olefinic distillate stream. All or part of the second bottoms stream may be passed to a first hydrogenation zone to generate a C$_9$+ paraffin stream. The C$_9$+ paraffin stream can be used for a paraffinic distillate product. The olefinic fifth process stream can be passed to a gasoline blending pool. Alternatively, all or part of the second overhead stream may be passed to a hydrogenation zone to generate a paraffinic gasoline stream.

In a second variation, the process includes the generation of a second bottoms stream from the deisobutanizer. The second bottoms stream comprises C$_5$+ hydrocarbons, and can be passed to other zones for further processing.

The oligomerization process is a catalytic process, and oligomerization catalysts can include a solid phosphoric acid catalyst, or a zeolitic catalyst. The oligomerization reactor zone may contain an oligomerization catalyst. The oligomerization catalyst may comprise a zeolitic catalyst. The zeolite may comprise between 5 and 95 wt % of the catalyst. Suitable zeolites include zeolites having a structure from one of the following classes: MFI, MEL, SFV, SVR, ITH, IMF, TUN, FER, EUO, BEA, FAU, BPH, MEI, MSE, MWW, UZM-8, MOR, OFF, MTW, TON, MTT, AFO, ATO, and AEL. These three letter codes for structure types are assigned and maintained by the International Zeolite Association Structure Commission in the ATLAS OF ZEOLITE FRAMEWORK TYPES, which is at http://www.iza-structure.org/databases/. UZM-8 is as described in U.S. Pat. No. 6,756,030. In a preferred aspect, the oligomerization catalyst may comprise a zeolite with a framework having a ten-ring pore structure. Examples of suitable zeolites having a ten-ring pore structure include those comprising: TON, MTT, MFI, MEL, AFO, AEL, EUO and FER. In a further preferred aspect, the oligomerization catalyst comprising a zeolite having a ten-ring pore structure may comprise a uni-dimensional pore structure. A uni-dimensional pore structure indicates zeolites containing non-intersecting pores that are substantially parallel to one of the axes of the crystal. The pores preferably extend through the zeolite crystal. Suitable examples of zeolites having a ten-ring uni-dimensional pore structure may include MTT. In a further aspect, the oligomerization catalyst comprises an MTT zeolite.

The oligomerization catalyst may be formed by combining the zeolite with a binder, and then forming the catalyst into pellets. The pellets may optionally be treated with a phosphoric reagent to create a zeolite having a phosphorous component between 0.5 and 15 wt % of the treated catalyst. The binder is used to confer hardness and strength on the catalyst. Binders include alumina, aluminum phosphate, silica, silica-alumina, zirconia, titania and combinations of these metal oxides, and other refractory oxides, and clays such as montmorillonite, kaolin, palygorskite, smectite and attapulgite. A preferred binder is an aluminum-based binder, such as alumina, aluminum phosphate, silica-alumina and clays.

One of the components of the catalyst binder utilized in the present invention is alumina. The alumina source may be any of the various hydrous aluminum oxides or alumina gels such as alpha-alumina monohydrate of the boehmite or pseudo-boehmite structure, alpha-alumina trihydrate of the gibbsite structure, beta-alumina trihydrate of the bayerite structure, and the like. A suitable alumina is available from UOP LLC under the trademark Versal. A preferred alumina is available from Sasol North America Alumina Product Group under the trademark Catapal. This material is an extremely high purity alpha-alumina monohydrate (pseudo-boehmite) which after calcination at a high temperature has been shown to yield a high purity gamma-alumina.

A suitable oligomerization catalyst is prepared by mixing proportionate volumes of zeolite and alumina to achieve the desired zeolite-to-alumina ratio. In an embodiment, about 5 to about 80, typically about 10 to about 60, suitably about 15 to about 40 and preferably about 20 to about 30 wt % MTT zeolite and the balance alumina powder will provide a suitably supported catalyst. A silica support is also contemplated.

Monoprotic acid such as nitric acid or formic acid may be added to the mixture in aqueous solution to peptize the alumina in the binder. Additional water may be added to the mixture to provide sufficient wetness to constitute a dough with sufficient consistency to be extruded or spray dried. Extrusion aids such as cellulose ether powders can also be added. A preferred extrusion aid is available from The Dow Chemical Company under the trademark Methocel.

The paste or dough may be prepared in the form of shaped particulates, with the preferred method being to extrude the dough through a die having openings therein of desired size and shape, after which the extruded matter is broken into extrudates of desired length and dried. A further step of calcination may be employed to give added strength to the extrudate. Generally, calcination is conducted in a stream of air at a temperature from about 260° C. (500° F.) to about 815° C. (1500° F.). The MTT catalyst is not selectivated to neutralize surface acid sites such as with an amine.

The extruded particles may have any suitable cross-sectional shape, i.e., symmetrical or asymmetrical, but most often have a symmetrical cross-sectional shape, preferably a spherical, cylindrical or polylobal shape. The cross-sectional diameter of the particles may be as small as 40 µm; however, it is usually about 0.635 mm (0.25 inch) to about 12.7 mm (0.5 inch), preferably about 0.79 mm (1/32 inch) to about 6.35 mm (0.25 inch), and most preferably about 0.06 mm (1/24 inch) to about 4.23 mm (1/6 inch).

When the catalyst comprises MTT zeolite, the fourth process stream may possess certain characteristics. The fourth process stream may comprise greater than 50 wt % distillate, preferably greater than 60 wt % distillate and most preferably greater than 70 wt % distillate. The fourth process stream may comprise less than 1 wt % aromatic hydrocarbons, preferably less than 0.5 wt % aromatic hydrocarbons and most preferably less than 0.1 wt % aromatic hydrocarbons. The sixth process stream may comprise less than 1 wt % aromatic hydrocarbons, preferably less than 0.5 wt % aromatic hydrocarbons and most preferably less than 0.1 wt % aromatic hydrocarbons. The sixth process stream may have a cetane number greater than 35, preferably greater than 40 and most preferably greater than 45. The seventh process stream may have a cetane number greater than 35, preferably greater than 40 and most preferably greater than 45. In an embodiment, the cetane number of the seventh process stream is at least two higher than the sixth process stream.

Any known process for the dehydrogenation of light paraffins to olefins may be used. Well known catalyst systems include chromia on alumina and platinum on alumina Preferably, greater than at least 25 wt % of the feed paraffins are converted to olefins in the dehydrogenation process and preferably at least 30 wt % of the feed paraffins are converted to olefins. If the light paraffin predominately comprises isobutane, conversion of light paraffin may exceed 40 wt %. The light paraffin feed does not comprise an oxidant such as oxygen. Conversion of the light paraffin typically does not exceed 50 wt %. Depending on the catalyst system and the properties of the dehydrogenation zone feed, the dehydrogenation reaction zone will use a solid catalyst that can operate as a fixed bed with swing regeneration, a semi-regenerated bed or in a continuous catalyst regeneration mode. The actual arrangement of the dehydrogenation zone may be relatively simple and include a single reactor and single heater. Moreover, the dehydrogenation catalytic reaction zone may consist of multiple catalyst beds. In one such system, the catalyst is employed within an annular bed through which it is movable via gravity flow. Preferred methods of dehydrogenating light hydrocarbons, suitable for the continuous dehydrogenation of isobutane using a continuous catalyst regeneration system are described in U.S. Pat. Nos. 5,227,566; 4,695,662; 3,978,150; 3,856,662; 3,854,887; 3,839,197; 3,825,116; and 3,706,536; the contents of which are hereby incorporated by reference.

In preferred form, the dehydrogenation process will employ a moving bed reaction zone and regeneration zone. Moving bed systems advantageously maintain production while the catalyst is removed or replaced. In a typical moving bed reaction zone fresh catalyst particles are fed through the reaction zones by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. The arrangement of typical combustion, drying and redispersion section in a moving bed may be seen in U.S. Pat. Nos. 3,653,231 and 5,227,566; the contents of which are hereby incorporated by reference.

Operating conditions for the preferred dehydrogenation zone of this invention will usually include an operating temperature in the range of from about 500° C. to about 700° C., an operating pressure of from about 7 to about 150 psig and a liquid hourly space velocity of from about 0.5 to about 50. The preferred operating temperature will be within the range of from about 550 to 660 degrees Celsius, and the preferred operating pressure is about 0.5 to 2 atmospheres. The preferred dehydrogenation catalyst is comprised of a platinum group component, preferably platinum, a tin component and an alkali metal component with a porous inorganic carrier material. Other catalytic compositions may be used within this zone if desired. The preferred catalyst contains an alkali metal component chosen from cesium, rubidium, potassium, sodium and lithium. The preferred alkali metal is normally chosen from lithium and potassium, with potassium being preferred for isobutane. Preferred dehydrogenation catalysts comprise an alkali metal and a halogen such as potassium and chlorine in addition to the tin and platinum group components. The preparation and use of dehydrogenation catalysts is well known to those skilled in the art and further details as to suitable catalyst compositions are available in patents, such as those cited above, and other standard references (U.S. Pat. Nos. 4,486,547 and 4,438,288).

In one embodiment, the invention comprises an apparatus 100 for the conversion of light paraffins to a distillate. The apparatus, as shown in FIG. 1, includes a first fractionation zone 10, having an inlet 12 for the passage of a feed light paraffin stream. The first fractionation zone includes an overhead outlet 14 for the passage of a stream comprising isobutane, and a bottoms outlet 16 for the passage of a stream comprising normal butane. The first fractionation zone 10 may further comprise a bottoms stream 13 to purge a $C_5$+ hydrocarbon stream from the apparatus. The apparatus 100 includes a dehydrogenation zone 20 having an inlet 22 in direct communication with the first fractionation zone overhead outlet 14, and an outlet 24 for the passage of a stream enriched in olefins versus that of the feed point 22. The stream at the outlet 24 may comprise a light olefin stream. The dehydrogenation zone 20 is thus in downstream communication with the first fractionation zone 10. The apparatus 100 includes a first reactor system 30 having an inlet 32 in direct communication with the dehydrogenation zone outlet 24, and an outlet 34 for the passage of a hydrocarbon stream comprising $C_5$+ hydrocarbons. The first reactor zone 30 is thus in downstream communication with the dehydrogenation zone 20 and the first fractionation zone 10. The first reactor zone 30 may comprise an oligomerization reaction zone. The oligomerization reaction zone may contain an oligomerization catalyst. Reaction conditions in the oligomerization reactor zone 30 are set to keep the reactant fluids in the liquid phase. As used herein, the phrase "liquid phase" is intended to mean either a liquid phase or a supercritical dense phase. With liquid oligomerate recycle, lower pressures are necessary to maintain liquid phase. Operating pressures include between about 2.1 MPa (300 psia) and about 10.5 MPa (1520 psia), suitably at a pressure between about 2.1 MPa (300 psia) and about 6.9 MPa (1000 psia) and preferably at a pressure between about 2.8 MPa (400 psia) and about 4.1 MPa (600 psia). Lower pressures may be suitable if the reaction is kept in the liquid phase. The temperature of the oligomerization reactor zone expressed in terms of a maximum bed temperature is in a range between about 140° and about 300° C. If diesel oligomerate is desired, the maximum bed temperature should between about 150° and about 250° C. and preferably between about 160° and about 245° C. The space velocity should be between about 0.5 and about 5 $hr^{-1}$.

The oligomerization reaction zone may comprise one or more reactors. Each reactor may comprise one or more beds of oligomerization catalyst. Across a single bed of oligomerization catalyst, the exothermic reaction will cause the temperature to rise. Consequently, the oligomerization reactor should be operated to allow the temperature at the outlet to be over about 22° C. or over about 25° C. greater than the temperature at the inlet.

The oligomerization reactor zone 30 with the oligomerization catalyst can be run in high conversion mode of greater than 90% conversion of feed light olefins to produce a high quality diesel product and gasoline product. Normal butene conversion can exceed about 80%. Additionally, normal pentene conversion can exceed about 80%.

The apparatus 100 further includes a second fractionation zone 40 having an inlet 42 in direct communication with the first reactor system outlet 34, and a second fractionation zone overhead outlet 44 for the passage of $C_5-$ hydrocarbon stream, and a second fractionation zone bottoms outlet 46 for the passage of an olefinic $C_5+$ hydrocarbon stream. The second fractionation zone 40 is thus in downstream communication with the first fractionation zone 10, the dehydrogenation zone 20 and the first reaction zone 30. The apparatus 100 further includes a third fractionation zone 50 having an inlet 52 in direct communication with the second fractionation zone bottoms outlet 46, and a third fractionation zone overhead outlet 54 for the passage of an olefinic gasoline process stream, and a third fractionation zone bottoms outlet 56 for the passage of an olefinic distillate process stream. At least a portion of stream at outlet 54 may operatively flow to a gasoline tank, storage area or blending facility 55. Optionally, the olefinic gasoline product 55 may be hydrogenated, fully or partially, in a hydrogenation zone such as a complete saturation process prior to final use. In an embodiment, the octane number of the hydrogenated stream 55 is greater than 80, is preferably greater than 90, but is less than 95. The apparatus 100 may further include a first hydrogenation zone 60 having an inlet 62 in direct communication with the third fractionation zone bottoms outlet 56 and an outlet 64 for the passage of a distillate product stream 65 that is now substantially saturated. Hydrogen enters the first hydrogenation zone in stream 61 and a stream depleted in hydrogen which may also comprise light hydrocarbons leaves the first hydrogenation zone 60 in stream 63. Prior to acceptance of the distillate product into the overall refinery distillate pool 65, the stream may be stripped to remove unreacted hydrogen or light hydrocarbons.

As described previously, the oligomerization zone feed stream may further comprise a portion of one or more product streams. Thus, in an embodiment, a portion of the second fractionation zone bottoms outlet 46 is in direct communication with the stream coming from the dehydrogenation zone outlet 24, thus forming the oligomerization zone feed stream prior to the first reactor zone inlet 32. Thus, the second fractionation zone 40 may be in upstream and downstream communication with the first reactor zone 30. In another embodiment, at least a portion of the third fractionation zone bottoms outlet 56 is in direct communication with the stream coming from the dehydrogenation zone outlet 24, thus forming the oligomerization zone feed stream prior to the first reactor zone inlet 32. Thus, the third fractionation zone 50 may be in upstream and downstream communication with the first reactor zone 30. In yet a further embodiment, at least a portion of the first hydrogenation zone outlet 64 is in communication with the stream coming from the dehydrogenation zone outlet 24, thus forming the oligomerization zone feed stream prior to the first reactor zone inlet 32. Thus, the first hydrogenation zone 60 may be in upstream and downstream communication with the first reactor zone 30.

An embodiment of the apparatus 100 can include a second hydrogenation zone 70 having an inlet 72 for the passage of a light paraffins feedstock stream and an outlet 74 in direct communication with the first fractionation zone inlet 12. Hydrogen enters the second hydrogenation zone in stream 71 and a stream depleted in hydrogen which may also comprise light hydrocarbons or $H_2S$ leaves the second hydrogenation zone 70 in stream 73. The second hydrogenation zone may be a standard hydrotreating zone, or it may be a hydrogenation zone specifically tailored for the hydrogenation of olefins, such as a complete saturation process. Preferably, the second hydrogenation zone is a hydrotreating zone.

The second fractionation zone outlet 44 may be in direct communication with the first fractionation zone inlet 18 for recycling of light paraffins. At least a portion of the second fractionation zone outlet 44 may be in direct communication with the dehydrogenation zone 20, thus forming at least a portion of the dehydrogenation zone feedstream at inlet 22. Preferably, the apparatus 100 can include a third hydrogenation zone 80 having an inlet 82 in direct communication with the second fractionation zone overhead outlet 44, and an outlet 84 in fluid communication with a second inlet 18 to the first fractionation column 10. Hydrogen enters the third hydrogenation zone 80 in stream 81. The third hydrogenation zone outlet 84 may be in direct communication with an inlet 92 of a fourth fractionation zone 90 also possessing an overhead outlet 93 to pass a stream depleted in hydrogen which may also comprise light hydrocarbons and a bottoms outlet 94 in direct communication with inlet 18 of the first fractionation zone. At least a portion of the stream coming from third hydrogenation zone outlet 84 may be recycled directly to the dehydrogenation zone 20, thus forming at least a part of the dehydrogenation zone feed stream present at inlet 22. Thus, the fourth fractionation zone 90 may be in upstream and downstream communication with the first fractionation zone 10. Thus, regardless of to where the second fractionation zone overhead outlet 44 directly communicates, the second fractionation zone 40 is in upstream and downstream communication with the dehydrogenation zone 20.

The apparatus 100 can further include an isomerization zone 110 having an inlet 112 in direct communication with the first fractionation zone bottoms outlet 16 and an outlet 114 in direct communication with a third inlet 19 to the first fractionation zone 10. Inlet 19 may be at a higher position on column 10 relative to outlet 16. Second inlet 18 may be at a higher position on column 10 relative to third inlet 19 and first inlet 12. In an embodiment, first inlet 12 may be at a position on column 10 between bottoms outlet 16 and third inlet 19. Thus, the first fractionation zone 10 may be in upstream and downstream communication with an isomerization zone 110.

Figure 2:
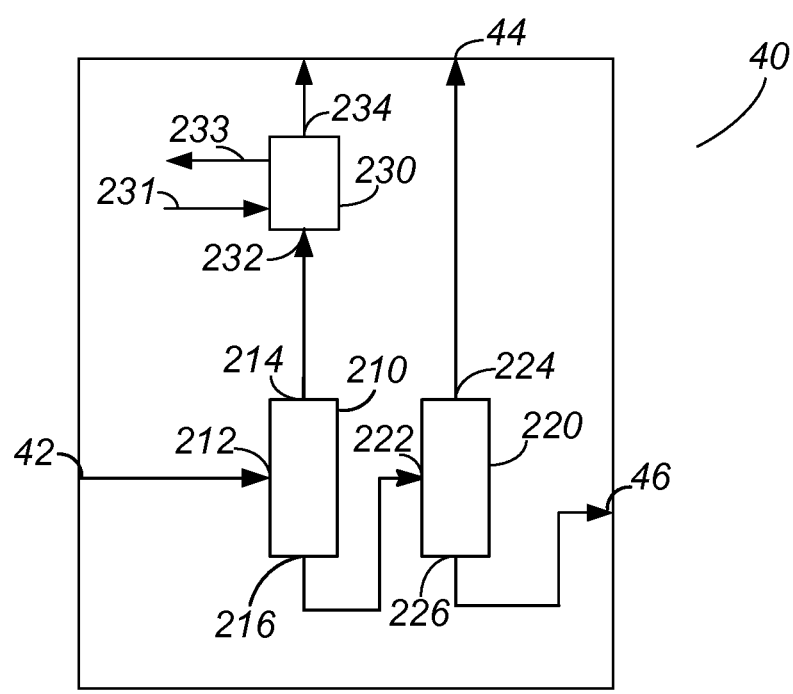
FIG. 2 is a diagram of a variation within the apparatus.

In one embodiment, the second fractionation zone 40, can comprise two fractionation columns, as shown in FIG. 2 wherein portions of the apparatus which have the same connectivity and function as that shown in FIG. 1 have identical numeration. The second fractionation zone 40 includes a first column 210 having an inlet 212 in direct communication with the first reactor system outlet 34, and a first column overhead outlet 214 to pass a stream comprising $C_3-$ hydrocarbons, and a first column bottoms outlet 216 to pass a stream comprising $C_4+$ hydrocarbons. In this embodiment, the second fractionation zone 40 also includes a second column 220 having an inlet 222 in direct communication with the first column bottoms outlet 216, a second column overhead outlet 224 to pass a stream comprising $C_4$ hydrocarbons, and a second column bottoms outlet 226 to pass a stream comprising $C_5+$ hydrocarbons. The second column bottoms outlet 226 is in direct communication with the third fractionation zone inlet 52.

The first column overhead outlet 214 can be in direct communication with the dehydrogenation zone inlet 22, or can be in upstream communication with a second dehydrogenation zone (not shown) for conversion of propane to propylene, or can be in direct communication with the inlet 232 of a fourth hydrogenation zone 230. Hydrogen enters the fourth hydrogenation zone 230 in stream 231. A hydrogen depleted stream, which may also comprise light hydrocarbons leaves the apparatus in stream 233. The outlet 234 of the fourth fractionation zone 230 may be in direct communication with the inlet 22 of the dehydrogenation zone 20 or with a second dehydrogenation zone (not shown) for conversion of propane to propylene. The first column of the second column of the second fractionation zone may be in upstream and downstream communication with the dehydrogenation zone. The second column overhead outlet 224 can be in direct communication with the inlet 82 of the third hydrogenation zone 80, and an outlet 84 to pass a stream comprising $C_4$ hydrocarbons in communication with a third inlet 18 to the first fractionation column 10.

In one embodiment, the apparatus 100 does not include the third fractionation zone 50. In this embodiment, the bottoms outlet 46 from the second fractionation zone 40 is in direct communication with the inlet 62 to the hydrogenation zone 60.

Examples

Example 1

Feed A, an example of a first process stream, was passed over a bed of oligomerization catalyst to generate the second process stream. The catalyst was ⅛" cylindrical extrudates of 25 wt % MTT zeolite and 75 wt % $Al_2O_3$. The pressure was 900 psig and feed rate was such that 1.5 WHSV was achieved. Various temperatures were examined to achieve the results below in Table 1, part A. The combined product was collected, fractionated with a cut point of 150° C. and the 150° C.+ product analyzed for cetane number. The plant configuration was then changed so that performance of recycling the $4^{th}$ process stream to the first reactor zone feed with a CFR (combined feed ratio=(fresh feed+recycle feed)/fresh feed) of 2.67 could be evaluated and this used in place of the hexane in Feed A. These results are shown for several temperatures in Table 1, part B. The product from this experiment was collected, fractionated as for part A and analyzed for cetane number.

| Feed A | |
|---|---|
| Component | Wt % |
| propylene | 0.34 |
| isobutane | 31.82 |
| isobutene | 25.00 |
| benzene | 0.01 |
| toluene | 0.02 |
| xylene | 0.09 |
| butadiene | 0.04 |
| hexane | 42.68 |

| | 160° C. | 180° C. | 200° C. | 220° C. | 230° C. | 240° C. |
|---|---|---|---|---|---|---|
| Part A | | | | | | |
| isobutene conversion (%) | 86.4 | 89.0 | 91.0 | 92.8 | 93.6 | 93.5 |
| C5-C8 selectivity (wt %) | 56.0 | 60.2 | 61.5 | 57.4 | 53.5 | 52.8 |
| C9+ selectivity (wt %) | 44.0 | 39.8 | 38.5 | 42.6 | 46.5 | 47.2 |
| Part B | | | | | | |
| isobutene conversion (%) | 78.1 | | 88.8 | | | 92.4 |
| C5-C8 selectivity (wt %) | 47.7 | | 42.5 | | | 29.8 |
| C9+ selectivity (wt %) | 52.3 | | 57.5 | | | 70.2 |

With recycle of the $4^{th}$ process stream to oligomerization feed, selectivity to greater than 50 wt % distillate is possible and results greater than 70 wt % were achieved. Also, the cetane number from the product of part A was 27.4 whereas that from part B was 38.1, a significant increase.

Example 2

Feed B, an example of a combined first process and fourth process stream, was passed over a bed of oligomerization catalyst to generate the second process stream. The catalyst was ⅛" cylindrical extrudates of 25 wt % MTT zeolite and 75 wt % $Al_2O_3$. The pressure was 900 psig and feed rate was such that 1.5 WHSV was achieved. A temperature of 220° C. was used and the results shown in Table 2 below. The product was collected, fractionated with a cut point of 150° C. and the 150° C.+ product analyzed for cetane number. The product had a cetane number of 53.7.

| Feed B | |
|---|---|
| Component | Wt % |
| isobutene | 9.1 |
| isobutane | 41.5 |
| n-butane | 1.5 |
| 1-octene | 47.9 |

TABLE 2

| 220° C. | |
|---|---|
| isobutene conversion (%) | 28.8 |
| C5-C8 selectivity (wt %) | 0.7 |
| C9+ selectivity (wt %) | 99.3 |

Example 3

Feed C, an example of a first process stream, was passed over a bed of oligomerization catalyst to generate the second process stream. The catalyst was ⅛" cylindrical extrudates of 25 wt % MTT zeolite and 75 wt % $Al_2O_3$. The pressure was 900 psig and feed rate was such that 1.5 WHSV was achieved. The plant configuration allowing recycling of the $4^{th}$ process stream to the first reactor zone feed with a CFR (combined feed ratio=(fresh feed+recycle feed)/fresh feed) of 2.67 was evaluated. A temperature of 240° C. was used and the results shown in Table 3 below. The product was collected, fractionated with a cut point of 150° C. and the 150° C.+ product analyzed for cetane number. The product had a cetane number of 43.2.

Feed C

| Component | Wt % |
|---|---|
| propylene | 16.5 |
| propane | 55.6 |
| isobutene | 13.7 |
| isobutane | 12.7 |
| n-butane | 1.0 |
| n-butenes | 0.4 |
| benzene | 0.1 |

TABLE 3

| 240° C. | |
|---|---|
| propylene and isobutene conversion (%) | 89.1 |
| C5-C8 selectivity (wt %) | 32.7 |
| C9+ selectivity (wt %) | 67.3 |

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for the production of distillate, comprising:
a first fractionation zone having a first inlet for the passage of a paraffin stream comprising $C_3$ and $C_4$ paraffins, and an overhead outlet for the passage of isobutane and propane, and a bottoms outlet for the passage of normal butane;
a dehydrogenation zone having an inlet in fluid communication with the first fractionation zone overhead outlet, and an outlet for passage of an olefin enriched stream;
a first reactor system having an inlet in fluid communication with the dehydrogenation zone outlet, and an outlet for the passage of a hydrocarbon stream comprising $C_5+$ hydrocarbons;
a second fractionation zone having an inlet in fluid communication with the first reactor system outlet, and a second fractionation zone overhead outlet for the passage of $C_4-$ hydrocarbons, and a second fractionation zone bottoms outlet for the passage of $C_4+$ and higher hydrocarbons;
a third fractionation zone having an inlet in fluid communication with the second fractionation zone bottoms outlet, and a third fractionation zone overhead outlet for the passage of an olefinic process stream, and a third fractionation zone bottoms outlet for the passage of a distillate process stream; and
a first hydrogenation process zone having an inlet in fluid communication with the third fractionation zone bottoms outlet and an outlet for the passage of a distillate product stream.

2. The apparatus of claim 1 further comprising a second hydrogenation zone having an inlet for the passage of the paraffin stream and an outlet in fluid communication with the first fractionation zone inlet.

3. The apparatus of claim 1 further comprising a third hydrogenation zone having an inlet in fluid communication with the second fractionation zone outlet, and an outlet in fluid communication with a second inlet to the first fractionation column.

4. The apparatus of claim 3 further comprising a fourth fractionation zone having an inlet in fluid communication with the third hydrogenation zone outlet, an overhead outlet for the passage of $C_3$ and lighter hydrocarbons, and a bottoms outlet in direct communication to the second inlet to the first fractionation column.

5. The apparatus of claim 1 wherein the first reactor system comprises a plurality of reactors in a series arrangement.

6. The apparatus of claim 1 wherein the second fractionation zone is in upstream and downstream communication with the first reactor system and the first fractionation zone.

7. The apparatus of claim 1 wherein the first reactor system includes a catalyst selected from the group consisting of zeolites having TON, MTT, MFI, MEL, AFO, AEL, EUO and FER type structures, and mixtures thereof.

8. The apparatus of claim 1 further comprising an isomerization zone, in upstream and downstream communication with the first fractionation zone, having an inlet in fluid communication with the first fractionation zone bottoms outlet, and an outlet for the passage of an isomerized stream to a second inlet to the first fractionation zone.

9. The apparatus of claim 1 wherein the second fractionation zone comprises:
a first column and a second column wherein the first column has an inlet in fluid communication with the first reactor system outlet, and a first column overhead outlet for the passage of $C_3$ and lighter hydrocarbon components, and a first column bottoms outlet for the passage of $C_4$ and heavier hydrocarbon components; and
a second column having an inlet in fluid communication with the first column bottoms outlet, a second column overhead outlet in fluid communication with the first fractionation zone inlet, and a second column bottoms outlet in fluid communication with the third fractionation zone inlet.

10. The apparatus of claim 9 further comprising a $C_3$ dehydrogenation zone having an inlet in fluid communication with the first column overhead outlet, and an outlet for the passage of a $C_3$ olefin enriched stream.

11. An apparatus for the production of distillate, comprising:
a dehydrogenation zone having an inlet for receiving a light paraffin feed, and an outlet for delivering a light olefins effluent;
an oligomerization zone having an inlet in fluid communication with the dehydrogenation zone outlet, and an outlet for delivering a hydrocarbon stream comprising $C_5+$ hydrocarbons; and
a first fractionation zone having an inlet in fluid communication with the oligomerization zone outlet, a bottoms outlet having fluid communication to the oligomerization zone inlet and a second outlet.

12. The apparatus of claim 11 further comprising:
a deisobutanizer column having a first inlet in fluid communication with the light paraffin feed, a first outlet in fluid communication with the dehydrogenation zone inlet and a second outlet; and
an isomerization zone having an inlet in fluid communication with the deisobutanizer column second outlet, and an outlet in fluid communication with a second deisobutanizer inlet.

13. The apparatus of claim 12 further comprising a hydrotreating zone having an inlet in fluid communication with the light paraffin feed, and an outlet in fluid communication with the deisobutanizer column.

14. The apparatus of claim 12 wherein the second outlet of the first fractionation zone is in fluid communication with a third inlet to the deisobutanizer column.

15. The apparatus of claim 14 wherein the third deisobutanizer inlet is at a higher position on the deisobutanizer column than either the first or second inlets to the deisobutanizer column.

16. The apparatus of claim 11 wherein the oligomerization zone comprises a plurality of oligomerization reactors in a series arrangement.

17. The apparatus of claim 11 wherein the oligomerization zone comprises a zeolitic catalyst having a structure selected from the group consisting of TON, MTT, MFI, MEL, AFO, AEL, EUO, FER and mixtures thereof.

18. The apparatus of claim 11 further comprising:
   a second fractionation zone having an inlet in fluid communication with the first fractionation zone bottoms outlet for passage of a stream comprising an olefinic $C_9+$ hydrocarbon stream, and a second outlet comprising a lighter olefinic stream; and
   a first hydrogenation zone having an inlet in fluid communication with the bottoms outlet of the second fractionation zone, and an outlet for passage of a completely saturated distillate hydrocarbon stream.

19. An apparatus for converting light paraffins to a liquid fuel, comprising:
   a first fractionation zone having an inlet for the passage of a feed light paraffin stream, an overhead outlet for the passage of a stream comprising isobutane, and a bottoms outlet for the passage of a stream comprising normal butane;
   a dehydrogenation zone having an inlet in direct communication with the first fractionation zone overhead outlet and having an outlet for the passage of a stream enriched in olefins versus that of the feed point;
   a first reactor system having an inlet in direct communication with the dehydrogenation zone and an outlet for the passage of a hydrocarbon stream comprising $C_5+$ hydrocarbons;
   a second fractionation zone having an inlet in direct communication with the first reactor system outlet, an overhead outlet for the passage of $C_5-$ hydrocarbon stream, and a bottoms outlet for the passage of an olefinic $C_5+$ hydrocarbon stream;
   a third fractionation zone having an inlet in direct communication with the second fractionation zone bottoms outlet, an overhead outlet for the passage of an olefinic gasoline process stream, and a bottoms outlet for the passage of an olefinic distillate process stream, and;
   wherein at least a portion of the second fractionation zone overhead stream is in communication with the dehydrogenation zone inlet such that the second fractionation zone is in upstream and downstream communication with the dehydrogenation zone.

20. The apparatus of claim 19 wherein the second fractionation zone overhead stream is in direct communication with the inlet to a hydrogenation zone and the outlet to the hydrogenation zone is in fluid communication with a second inlet to the first fractionation zone such that the second fractionation zone is in upstream and downstream communication with the first fractionation zone.

* * * * *